United States Patent [19]

Noerens

[11] Patent Number: 4,976,331
[45] Date of Patent: Dec. 11, 1990

[54] PROCESS AND DEVICE FOR CONTROLLING THE DRIVING TORQUE TRANSMITTED BY A TRACTOR TO A HYDRAULICALLY POWERED TRAILER

[76] Inventor: Willy J. Noerens, 396 Chaussee de Bruxelles, B-7498 Braine-Le-Comte, Belgium

[21] Appl. No.: 336,056

[22] Filed: Apr. 11, 1989

[30] Foreign Application Priority Data

Apr. 12, 1988 [BE] Belgium ............................ 88/00409

[51] Int. Cl.$^5$ ............................................ B62D 59/04
[52] U.S. Cl. .................................. 180/197; 180/14.3; 180/53.4; 180/242
[58] Field of Search .................... 180/14.1, 14.2, 14.3, 180/14.4, 242, 53.1, 197, 53.4

[56] References Cited

U.S. PATENT DOCUMENTS

| 4,502,558 | 3/1985 | Mauri | 180/14.3 |
| 4,685,527 | 8/1987 | Oswald et al. | 180/14.3 |

FOREIGN PATENT DOCUMENTS

| 0054500 | 6/1982 | European Pat. Off. . |
| 394822 | 12/1965 | Switzerland . |
| 394829 | 12/1965 | Switzerland . |

Primary Examiner—Charles A. Marmor
Assistant Examiner—Mitchell Bompey
Attorney, Agent, or Firm—Oblon, Spivak, McClelland, Maier & Neustadt

[57] ABSTRACT

A method for controlling the driving torque transmitted to a trailer having hydraulically powered driving axles. The tractor pulling the trailer is driven directly by an engine. The engine also drives a hydraulic pump which feeds at least one hydraulic motor on the trailer. The hydraulic system is controlled so that the speed of the driving wheels of the trailer is the same as the driving wheels of the tractor. The volumetric capacity of the pump or motor is controlled to control the torque transmitted to the trailer. The system is controlled by comparing the ratio of the rotational speeds of the hydraulic motor and hydraulic pump to a predetermined valve.

12 Claims, 3 Drawing Sheets

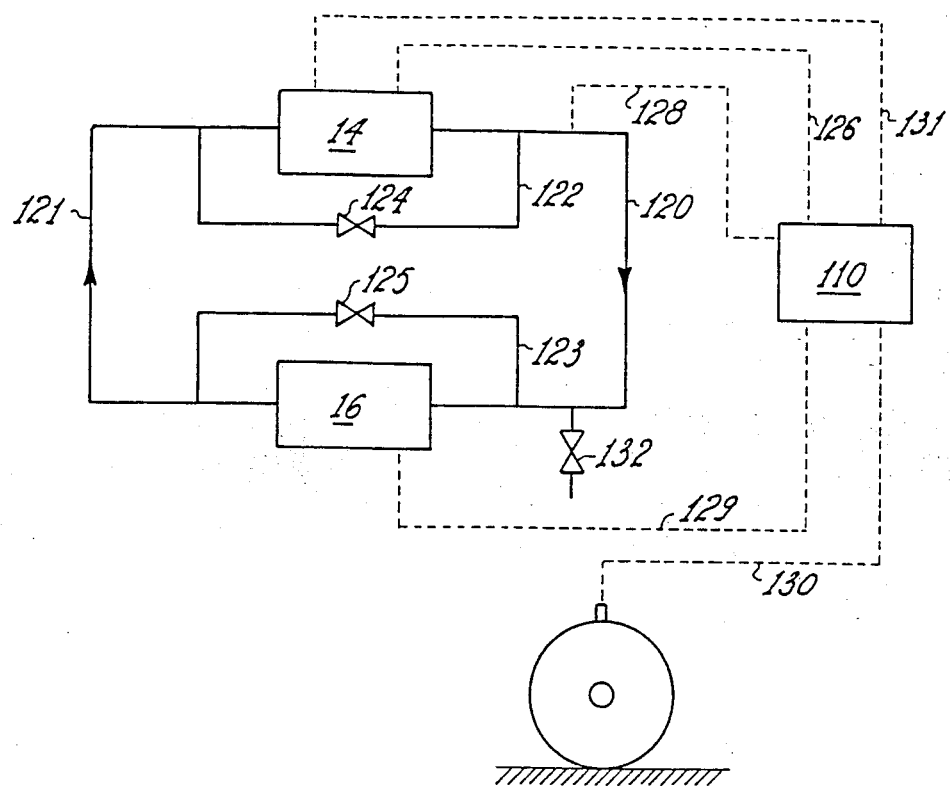
_FIG.2_
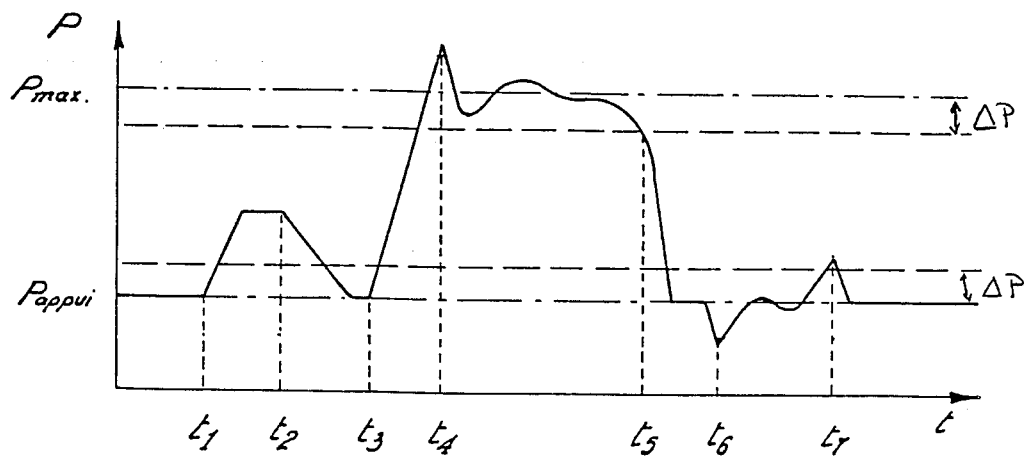
_FIG.4_

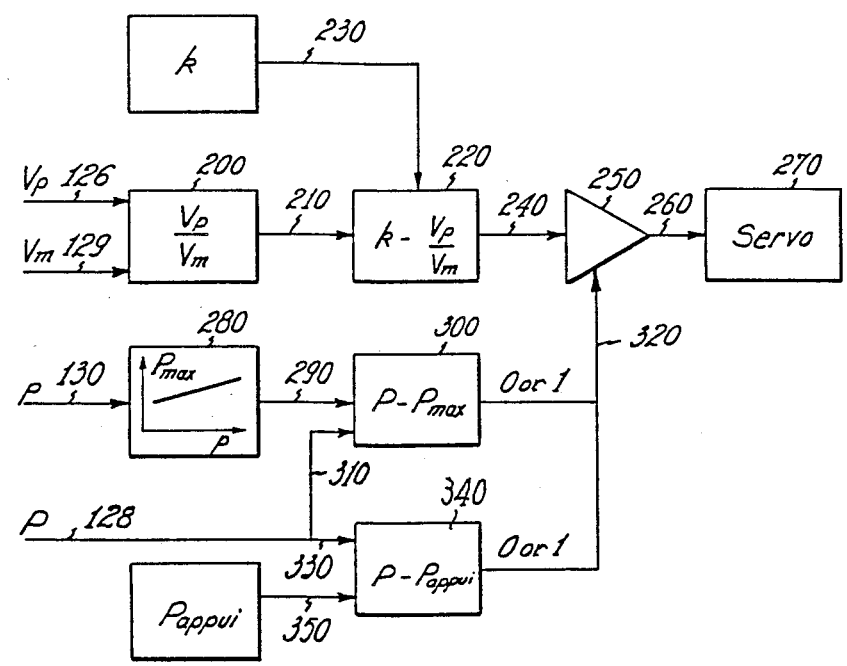
FIG_3

PROCESS AND DEVICE FOR CONTROLLING THE DRIVING TORQUE TRANSMITTED BY A TRACTOR TO A HYDRAULICALLY POWERED TRAILER

BACKGROUND OF THE INVENTION

1. Field of the Invention

The present invention relates generally to a trailer having hydraulically powered driving axles and more particularly to controlling the driving torque of a vehicle, the trailer of which has hydraulically powered driving axles.

2. Discussion of Background

Although it is not limited to this particular application, the invention particularly applies to vehicles adapted to run on difficult terrain such as work sites, sandy ground and the like.

The problem which the invention aims to deal with is substantially to share the driving load between the tractor and its trailer, so as to get an all-purpose vehicle with driving wheels on the trailer as well as on the tractor (and preferably in which every wheel is a driving wheel), in order to avoid situations such as the vehicle getting stuck in sand, mud, and the like, the pulling of the entire load by the tractor due to too little thrust from the trailer, and jackknifing due to too much thrust from the trailer.

The invention particularly applies to a vehicle provided with a powering system known in the art where the motor of the tractor drives, through a gear box, on one hand its own driving wheels and on the other hand a pump feeding a hydraulic motor on the trailer, this latter motor then driving the driving wheels on the trailer.

Such a driving system, when appropriately designed particularly in regard to the sharing of the driving force between the tractor and the trailer, operates satisfactorily when the vehicle runs straight forward, and when the driving wheels each have the same traction, and thus run at the same speed.

However, in a curve, the tractor travels through a path with a larger radius than the path followed by the trailer and, without control device, the hydraulic motor, the speed of which is mechanically bound to the means speed of the driving wheels of the trailer, tends to slow down and to increase the pressure in the circuit.

On the other hand, in cross country use, the vehicle encounters varying traction conditions. Two conditions are indeed possible as a function of the loss of traction which occurs either on the tractor, or on the trailer. Without any correction applied to the system, when the tractor begins to slip, an increase of the output of the pump occurs. Since the speed of the pump is mechanically bound to the mean speed of the driving wheels of the tractor, the pressure in the hydraulic circuit is thus increased. So, the torque transmitted to the driving wheels of the trailer by the hydraulic motor also increases, since the hydraulic motor, the speed of which is mechanically bound to the mean speed of the driving wheels of the trailer, resists to this flow increase. If no correction is applied, this increase of the torque results in either the driving wheels of the trailer slipping when the traction is not good enough, or a chance that the vehicle could jackknife due to too much thrust from the trailer.

On the contrary, and for the same reasons, when the trailer starts to slip, a lowering of the pressure in the circuit occurs, and thus the driving torque from the trailer decreases. If no correction is applied, a major part, and possibly all the benefit of a powering of the trailer is lost.

SUMMARY OF THE INVENTION

According to the invention, these problems are solved by providing a process and a device for controlling the torque transmitted to the trailer, in which the volumetric capacity of the pump or the volumetric capacity of the motor is controlled, in the direction needed for compensating the pressure variation. It should be noted here that the variation of the capacity must obviously be made in opposite directions for the same correction, depending on whether the pump or the motor is controlled.

An object of the invention is thus to provide a process for controlling the torque transmitted to the trailer of a tractor-trailer vehicle, in which the motor of the tractor drives on one hand the driving wheels of the tractor, through a gear box, and on the other hand, through a power take-off, a hydraulic pump feeding, via a hydraulic circuit, at least one hydraulic motor on the trailer, said hydraulic motor driving the driving wheels of the trailer, the rotating speed of the pump being bound to the rotational speed of the wheels of the tractor, and the rotational speed of the motor being bound to the rotational speed of the wheels of the trailer, said process comprising the steps of:

establishing, in the hydraulic circuit interconnecting the hydraulic motor and the hydraulic pump, between the input and the output of at least one of the hydraulic motor and the hydraulic pump machines, a by-pass circuit adapted to allow a slipping between the speed of the hydraulic motor and the speed of the hydraulic pump, generating in the by-pass circuit a pressure loss such that a variation of the speed slipping, resulting in a variation of the flow through said by-pass circuit, produces a perceptible pressure difference in the pressure side of the hydraulic circuit, determining the slipping between the rotational speed $V_m$ of the hydraulic motor and the speed $V_p$ of the hydraulic pump, in relation to a reference value, and simultaneously checking the pressure in the pressure side of the hydraulic circuit and, when said pressure goes outside a predetermined interval, acting on the capacity of at least one of the hydraulic pump or hydraulic motor machines to bring the slipping back to zero.

According to another feature of this process, the speed slipping is determined by the difference $(k - V_p/V_m)$ between a predermined value (k) and the actual value $(V_p/V_m)$ of the ratio between the speed of the hydraulic pump and the speed of the hydraulic motor.

According to another feature of this process, one acts on the capacity of one of the hydraulic machines by a correction signal proportional to said difference $(k - V_p/V_m)$ between the predetermined value and the actual value of the speed ratio $V_p/V_m$.

According to another feature of this process, one defines for the pressure side of the pump-motor hydraulic circuit, on one hand a maximum pressure $P_{max}$ corresponding to the maximum driving force required from the trailer, and on the other hand a minimum pressure $P_{appui}$ corresponding to the minimum driving force reuired from the trailer, and defining said predetermined pressure interval by the pressure interval between the pressure $P_{max}$ and the pressure $P_{appui}$.

According to another feature of this process, the load on the trailer is measured, and $P_{max}$ is defined as a function of said load.

According to another feature of this process, the leakages of the hydraulic machines and the hydraulic circuit are used as by-passes, and the pressure losses in the leakages are used to establish the required relationship between the pressure and the flow through the by-passes, of the speed slipping.

According to another feature of this process, the leakages are supplemented by a true by-pass, with a predetermined pressure loss, for establishing the required relationship between the pressure and the flow through the by-pass, or the speed slipping.

According to another feature of this process, the capacity of the hydraulic pump with variable capacity is changed, while maintaining constant the capacity of the hydraulic motor.

According to another feature of this process, the capacity of the hydraulic motor with variable capacity is changed, while maintaining constant the capacity of the hydraulic pump.

According to another feature of this process, the capacity of the hydraulic pump and the capacity of the hydraulic motor are changed in opposite directions.

Another object of the invention is to provide a process for controlling the torque transmitted to the trailer of a tractor-trailer vehicle, in which the motor of the tractor drives on one hand the driving wheels of the tractor, through a gear box, and on the other hand, through a power take-off, a hydraulic pump feeding, via a hydraulic circuit, at least one hydraulic motor on the trailer, said hydraulic motor driving the driving wheels of the trailer, the rotating speed of the pump being bound to the rotational speed of the wheels of the tractor, and the rotational speed of the motor being bound to the rotational speed of the wheels of the trailer, said process comprising the steps of:
  determining the relationship, in the hydraulic circuit, between the fluid pressure on one hand, and the relative difference between the theoretical flow of the pump and the theoretical consumption of the hydraulic motor, on the other hand,
  determining the volumetric capacity of one of said hydraulic motor and hydraulic pump, of which at least one has an adjustable capacity, with regard to the other so that, taking account for the above mentioned relationship, and assuring no slipping of the wheels of the vehicle, and thus for a predetermined relative value of the speeds of the hydraulic machines, the pressure in the circuit substantially establishes to the minimum pressure $P_{appui}$,
  generating, for the hydraulic machine with adjustable capacity, a correction signal for the capacity, as a function of the difference between the present relative value of the speeds of the hydraulic pump and hydraulic motor machines and said predetermined relative value, and
  measuring the pressure in the circuit and, when said pressure falls within a predetermined interval around the pressure $P_{max}$, feeding said correction signal to said control system for the hydraulic machine with an adjustable capacity.

Another object of the invention is to provide a device for controlling torque, comprising a vehicle having a tractor and a trailer, said tractor having a motor for driving the wheels of the tractor and also for driving a hydraulic pump, a trailer connected to said tractor having at least one hydraulic motor connected to said hydraulic pump by way of a hydraulic circuit for driving the wheels of the trailer, a control circuit, a first signal line connecting said pump with said control circuit for carrying a signal indicative of the rotational speed of the pump, a second signal line connecting said pump and said control circuit for carrying a signal indicative of the output pressure of the pump, a third signal line connecting said hydraulic motor with said control circuit for carrying a signal indicative of the rotational speed of the motor, a fourth signal line connecting said trailer with said control circuit for carrying a signal indicative of the load on the trailer, an output signal line connecting said control circuit with said pump to control the capacity of the pump according to the signal carried therein, wherein said control circuit receives signals from said first to fourth signal lines and produces said control signal in order to control said pump and accordingly the amount of torque transmitted to the trailer.

Another objet of the invention is to provide a device for controlling torque, comprising a vehicle having a tractor and a trailer, said tractor having a motor for driving the wheels of the tractor and also for driving a hydraulic pump, a trailer connected to said tractor having at least one hydraulic motor connected to said hydraulic pump by way of a hydraulic circuit for driving the wheels of the trailer, a control circuit, a first signal line connecting said pump with said control circuit for carrying a signal indicative of the rotational speed of the pump, a second signal line connecting said pump and said control circuit for carrying a signal indicative of the output pressure of the pump, a third signal line connecting said hydraulic motor with said control circuit for carrying a signal indicative of the rotational speed of the motor, a fourth signal line connecting said trailer to said control circuit for carrying a signal indicative of the load on the trailer, an output signal line connecting said control circuit with said motor to control the capacity of the motor according to the signal carried therein, wherein said control circuit receives signals from said first to fourth signal lines and produces said control signal in order to control said motor and accordingly the amount of torque transmitted to the trailer.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 2 is a simplified diagram of the hydraulic circuit between the pump and the hydraulic motor, and of the associated control system, FIG. 3 is a block-diagram of a control circuit which may be used in the invention, FIG. 4 is a diagram of the pressure curve in the hydraulic circuit as a function of the time, according to the running conditions of the vehicle.

DESCRIPTIONS OF THE PREFERRED EMBODIMENT

Figure 1:
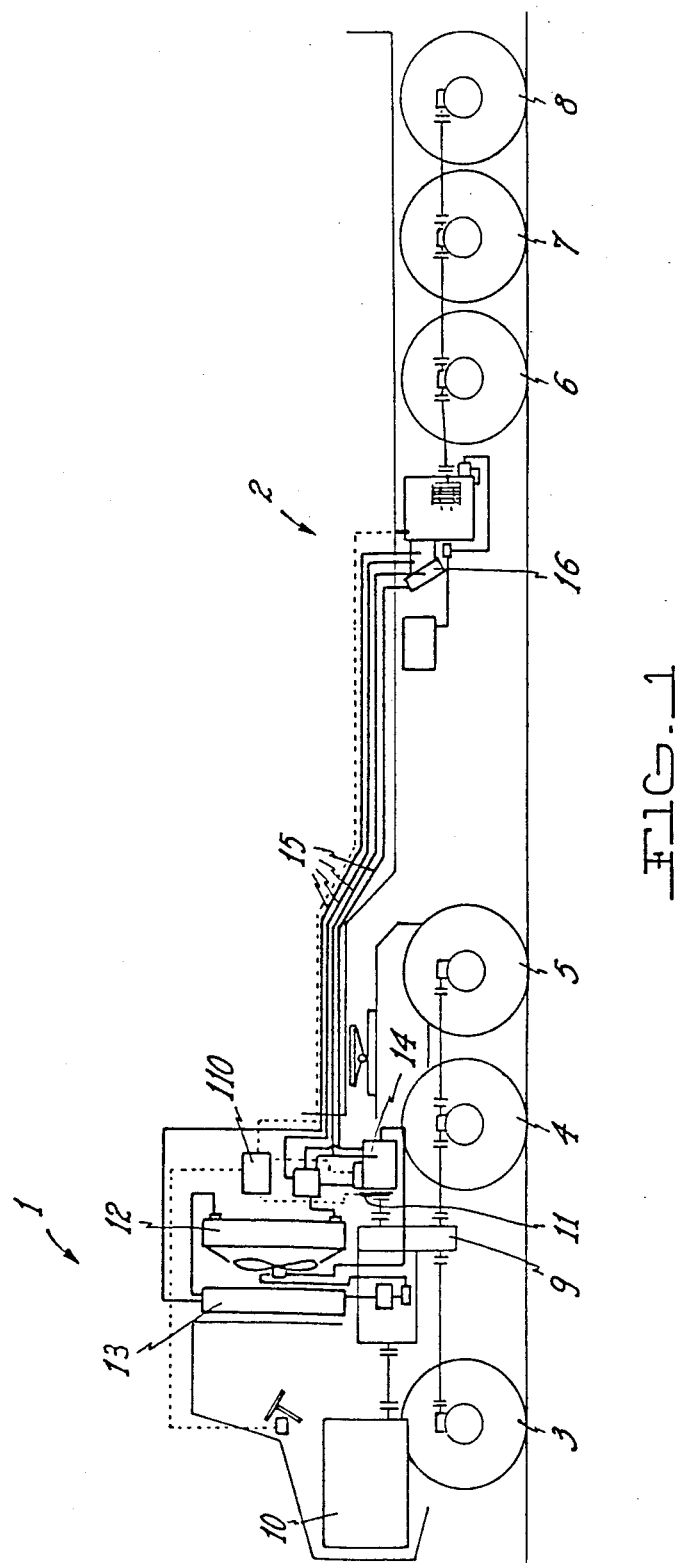
FIG. 1 is a schematic diagram of a powering system for a vehicle, with hydraulic powering of the trailer.

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 1 shows the vehicle comprising a tractor 1 and a trailer 2 where every axle 3, 4 and 5 of the tractor are driving axles, as well as all the axles 6, 7 and 8 of the trailer.

The axles of the tractor are mechanically driven in a known manner, via differentials, through the gear box 9 of the motor 10 of the tractor.

A power take off 11 at the output of the gear box 9 of the tractor drives on the other hand a pump 14 mounted on the tractor and connected to a hydraulic circuit comprising lines 15 feeding a hydraulic motor 16 on the trailer. This latter hydraulic motor then drives, through a mechanical transmission, the driving axles 6, 7 and 8 of the trailer.

This kind of powering system is known in the art, and the problem the invention aims to deal with, is to automatically adapt the driving force provided by the hydraulic system, as function of the instantaneous running conditions of the vehicle, notably slowing down of the trailer due to a turning path, beginning of slipping of the tractor or beginning of slipping of the trailer, this adaptation being obtained in the described embodiment, by acting on the capacity of the pump 14 with adjustable capacity.

The hydraulic circuit obviously includes the required conventional auxiliary devices, such as an oil tank 13, an oil cooling radiator 12, and the like.

According to the invention, and as mentioned, the control of the driving torque from the trailer is obtained at will by adjusting the capacity of the pump or the capacity of the motor, based on working parameters of the hydraulic system which are mainly the slipping between the rotation speed of the pump and the rotation speed of the hydraulic motor, or variation of the ratio between said speeds, and the pressure of the hydraulic fluid, this parameter being fed, when the pressure of the hydraulic fluid in the pressure side of the circuit falls outside a predetermined interval, to a control circuit which acts back on a servomechanism for adjusting the capacity of the hydraulic machine, pump or motor, with adjustable capacity.

In the following, and for the clarity of the description, one will however consider only the case of a pump with adjustable capacity, this description applying in a similar manner to the case of the motor with adjustable capacity.

It is also possible according to the invention to act in the opposite direction, both on the capacity of the pump and the capacity of the motor, although there is at first glance no particular advantage in doing so, while complicating the system.

The invention will be better understood in relation to the diagram of FIG. 2, where the hydraulic circuit is represented by the pump 14 feeding the motor 16 by a pressure duct (pressure side) 120 and a return duct 121, and including by passes 122 and 123 around the pump and the motor, by-passes including throttling valves 124 and 125.

The by-passes 122 and 123 represent at least the leakages of the hydraulic system, and particularly of the pump and the motor, although these leakages actually lead to the ambient, and are not connected between the pressure and the return sides of the circuit. The corresponding pressure losses are schematically shown by the throttling valves 124 and 125.

In such a schematic circuit, just as in an actual hydraulic circuit, due to the above mentioned leakages, which take fluid from the pressure side, the theoretical flow of hydraulic fluid used up by the motor will usually be lower than the theoretical flow from the pump to the motor, the difference being a function of the force requested from the hydraulic motor.

By "theoretical flow" is meant the flow determined by calculation, from the rotational speed and the capacity of the hydraulic machine, thus with no account for leakages.

In normal operating conditions, the speed ($V_p$) of the pump and the speed ($V_m$) of the hydraulic motor are proportional, i.e. $V_p = kV_m$, since the tractor and its trailer are running at the same speed, and the proportionality factor k is determined by the transmission characteristics between the motor, the driving axles of the tractor and the pump, on one hand, and between the hydraulic motor and the driving axles of the trailer, on the other hand.

By "normal operating conditions", is meant the conditions in which the wheels of the tractor and of the trailer run at the same speed, i.e. when the vehicle travels straight forward and there is no slipping of the wheels, neither of the tractor nor of the trailer.

In such normal operating conditions, the pressure existing in the hydraulic system is substantially independent of the varying load on the motor (for example as a function of the speed of the vehicle, and of the slope of the ground on which it runs), and thus depends mainly on the ratio between the capacity of the pump and the capacity of the hydraulic motor, taking into account the characteristics of pressure loss of the system, since the proportionality factor k between the pump speed and the motor speed is determined by the characteristics of the transmissions.

According to the invention, this characteristic of speed proportionality is used for regulation of the system. Indeed any variation between the ratio $V_p/V_m$ of the actual speeds of the pump and the motor on one hand, and their predefined ratio k on the other hand, is detected and, when this variation results in a variation of the pressure, and thus of the driving torque of the trailer, beyond predetermined limits, the capacity is changed in the required direction for bringing the pressure back within the predetermined limits.

The trailer thus provides under normal conditions a substantially constant driving torque which is preselected as a function, for example, of the kind of vehicle.

Any additional load on the motor, when it increases, must thus be taken by the driving axles of the tractor only.

When the time comes that, due to a little loss of traction, or merely because the load becomes too high, the driving wheels of the tractor skid or slip, even a little, the speed of the pump, which is bound to the mean speed of the driving wheels of the tractor, increases, while the speed of the hydraulic motor, which is bound to the mean speed of the driving wheels of the trailer, and thus to the actual running speed of the vehicle, does not vary. The flow of the pump thus increases without a corresponding increase of the consumption of the motor, and the circuit comes to a new balancing pressure, higher then the previous one, for which the leakages of the circuit use up this flow difference.

In this regard, if the leakage flow is insufficient for this purpose, it can be supplemented by one or more true by-passes in the circuit.

The hydraulic motor, since it is fed by a higher pressure, provides a higher driving torque so that the trailer takes a larger part in the driving force of the vehicle, and thus stops the slipping and brings the vehicle back into the initial "normal conditions".

This torque must however be maintained within predetermined limits, preferably as a function of the load on the trailer, and this is the reason for the control of the pressure in the pressure side of the hydraulic circuit, by varying the capacitiy of the hydraulic machine in the direction determined by the variation of the speed ratio $V_p/V_m$ in relation to the predefined ratio k until the pressure, and thus the torque, comes back within the predetermined limits.

In FIG. 2 there is also shown schematically at 132 a safety circuit which sends back the hydraulic fluid directly, for example to the tank, when the pressure goes beyond the maximum allowable pressure.

At FIG. 2, the electrical connections between the measuring probes for the various parameters and the control circuit 110 are shown schematically by broken lines.

So, the line 126 feeds to circuit 110 a signal ($V_p$) proportional to the rotational speed of the pump, while line 128 feeds to circuit 110 a signal (P) proportional to the output pressure of the pump.

The circuit 110 also receives from line 129 a signal ($V_m$) proportional to the rotational speed of the hydraulic motor, and by line 130 a signal (p) proportional to the load on the trailer.

The circuit acts at its output on the capacity of the pump by a signal in line 131.

The speed signal $V_p$ provided by line 126 is proportional to the rotational speed of the pump 14, and thus to the rotational speed of the driving wheels of the tractor.

In the same manner, the signal in line 129 is proportional to the rotational speed $V_m$ of the hydraulic motor, and thus to the rotational speed of the driving wheels of the trailer.

According to a preferred embodiment, one determines at first, and for a given vehicle, a first reference value for the capacity of the pump of the hydraulic system so that under normal operating conditions, a first pressure or "supporting" pressure is obtained in the hydraulic circuit, which merely assures a little contribution of the trailer to the driving force, for example just high enough to compensate the rotational friction loss of the trailer.

One also defines on the other hand a maximum pressure beyond which the capacity of the pump must be reduced to avoid too much thrust from the trailer, taking into account the characteristic of the trailer and the tractor.

This maximum pressure will preferably be a function of the load on the trailer.

The operation of the system, based as described above on the detection of a slipping, or variation of the speed ratio compared to a predetermined speed ratio, is as follows.

Assuming the vehicle runs straight forward on solid ground, the pressure in the hydraulic circuit stays substantially at the first pressure, or supporting pressure $P_{appui}$.

Now, when the vehicle begins to turn, the trailer follows a shorter path, and runs thus slower than the tractor. The speed of the hydraulic motor slows down relative to the speed of the pump, which remains unchanged, and the pressure increases in the circuit.

As soon as the pressure $P_{max}$ is reached, the circuit 110 sends to the servo-mechanism on line 131, a correction signal for the capacity of the pump, proportional to and of the same sign as the value of the variation $(k - V_p/V_m)$, so as to counteract the pressure variation in the circuit.

In the case where the tractor begins to slip, the same operation results, since in that case also the ratio $V_p/V_m$ increases, due in that case to the increase of the speed of the pump with the speed of the hydraulic motor remaining constant.

Let us consider the case when the trailer slips.

In that case, the speed of the hydraulic motor increases, while the speed of the pump remains constant; the ratio $V_p/V_m$ decreases, and the pressure goes down; the direction of the difference $k - V_p/V_m$ changes, and thus the direction of the correction signal for the capacity generated by the control circuit 110. Similar to the case of the pressure increase, the correction signal is actually sent to the servomechanism adjusting the capacity of the pump only when the pressure goes below the minimum pressure $P_{appui}$.

Referring to FIG. 3, it represents diagrammatically an embodiment of the control circuit 110 of FIG. 2.

The system feeds this circuit with: a signal $V_p$ proportional to the rotational speed of the pump, in line 126; a signal $V_m$ proportional to the rotational speed of the motor, in line 129; a signal p proportional to the load on the trailer, in line 130; and a signal P proportional to the pressure in the pressure side of the hydraulic circuit, in line 128.

A first section of the circuit is adapted to provide an error signal, as herebelow.

The circuit 200 calculates, form the actual speed signals, $V_p$ and Vm, the actual ratio $V_p/V_m$, and a signal proportional to this ratio is sent by line 210 to circuit 220 which also receives, through line 230, a signal proportional to the predefined ratio k between the speeds $V_p$ and $V_m$, and send in line 240 a signal proportional to $(k - V_p/V_m)$ to a switching member 250, the output of which is connected through a line 260 to a servomotor 270 adjusting the capacity of the concerned hydraulic machine, i.e. the pump 14 in the example of FIG. 2.

A second section of the circuit is adapted to determine when the error signal must or must not be sent to the servomotor of the concerned hydraulic machine.

Indeed, as already mentioned, the error signal - calculated continuously - is sent to the concerned machine only when the pressure in the pressure side of the system becomes respectively to high (too high driving force or thrust from the trailer), or too low (insufficient driving force or thrust from the trailer). In this regard, it is still useful to point out here that the lower limit of the pressure is usually of less importance than the upper limit; indeed, a too high pressure gives rise, in addition to a too high thrust from the trailer, and thus a chance of slipping thereof, or jackknifing of the tractor, a chance of breakage of the circuit (or rather a chance of actuation of the pressure valves), while an instantaneous too low, or nul thrust from the trailer gives obviously rise to a temporary loss of the benefit of its motorisation, but does not give rise to detrimental consequence for the system.

This second part of the circuit includes a bloc 280 which receives, through line 130, a signal p proportional to the load on the trailer and, as a function of a relationship $P_{max}=f(p)$, predefined for example for the kind of the vehicle, gives at its output, in line 290, a signal proportional to the maximum pressure $P_{max}$ adjusted as a function of said load.

Although this has not been shown on the figure, because it is of lower actual interest, it is obviously also possible to provide for an adjustment of the minimum pressure $P_{appui}$ as a function of the load on the trailer.

A signal P proportional to the instantaneous pressure in the pressure side of the circuit is on the other hand provided to the control circuit through line 128, and feeds through line 310 an input of a logic circuit 300 which also receives the signal $P_{max}$ in line 290 and, as a function of the sense of the difference ($P - P_{max}$), provides a signal 0 or 1 in line 320.

The same signal P also feeds, by line 330, a logic circuit 340, similar to circuit 300, which also receives the predefined reference signal $P_{appui}$, in line 350 and, as a function of the sense of the difference ($P - P_{appui}$), provides a 0 or 1 signal in line 320.

The signal in line 320 will be 0 when the pressure P lies in the range $P_{max} \geq P \geq P_{appui}$, and 1 when P lies outside this range.

This signal in line 320 feeds the input or switching gate of switch 250, which is set in the non-conducting state when its gate input is 0, and conducting when its gate input is 1. When conducting, the switch 250 feeds the correction signal, by line 260, to servomotor 270 which acts on the concerned hydraulic machine, while it blocks this signal, and thus the correction, when in the non-conducting or blocking state.

One so provides, without correction and within a predetermined pressure interval, an automatic adjustment of the driving torque from the trailer to the torque required from the tractor, determined by its propensity to slip, the correcting action being applied only when the pressure is too high, or too low.

In the above description, only a single hydraulic motor on the trailer has been considered, which drives the wheels through a mechanical transmission. When appropriate, however, the scope of the invention also to provides for several hydraulic motors on the trailer, each driving for example a driving axle, and being fed by a hydraulic pump.

The hydraulic pumps with adjustable volumetric capacity and their control procedures are known, and must not be described in more detail.

Referring now to FIG. 4, there is schematically shown the variation of the pressure in the circuit versus time, as a function of the various conditions of circulation of the vehicle and the corrections made on the capacity of the pump.

In FIG. 4, it has been considered, in addition to what has been said previously, that the control circuit is designed, in order to improve stability, so that the correction, once activated as soon as the pressure has gone outside the interval $P_{max} \leq P \leq P_{appui}$, remains activated until the pressure goes lower than $P_{max} - \Delta P$, or higher than $P_{appui} \Delta P$, $\Delta P$ being defined as a function of the time constant of the system.

The pressure rises at the beginning very rapidly to the selected pressure $P_{appui}$. During the time period $0 - t_1$, the pressure remains constant, i.e. the vehicle runs in normal conditions as definied here, in which the tractor assumes alone substantially all of the additional driving torque needed for example by an acceleration of the vehicle, a slope, etc.

During the time period $t_1-t_2$, the pressure increases in the system and then stabilizes. This means that the vehicle is subject to worse running conditions, in which the driving torque required from the tractor leads to a very little slipping of its driving wheels. The new equilibrium pressure which is reached is the one at which the higher driving torque from the trailer is high enough, taking into account the sharing of the power force between the tractor and its trailer, to stabilize the very little slipping of the wheels of the tractor.

During the time period $t_2-t_3$, the pressure goes back down to the minimum pressure $P_{appui}$, the vehicle being again subject to normal running conditions, thus without any slipping.

During the time period $t_3-t_5$, the pressure increases first until time $t_4$, where the correction is made with some lag. So long as the pressure lies above the threshold $P_{max}-\Delta P$, the correction signal for the capacity is permanently sent to the servo-mechanism controlling the capacity of the pump, and the pressure remains around the pressure $P_{max}$, i.e. in the area where the power force provided by the trailer is at a maximum.

At $t_5$, the slipping of the wheels of the tractor has gone down back to a level such that the pressure in the circuit goes below the upper threshold of the correction interval, and the correction signal ceases to act on the servo-mechanism for the control of the capacity, which comes back to its predefined adjustment position for producing the pressure $P_{appui}$.

At $t_6$, the wheels of the trailer begin to slip.

As soon as the pressure fall below $P_{appui}$, the correction signal is permanently sent to the servo-mechanism for the adjustment of the capacity of the pump for increasing its capacity and increasing the pressure up to time $t_7$, where the pressure goes above the threshold $P_{appui}+\Delta P$, and the correction signal ceases to act, the servo-mechanism going back to its initial predefined state for providing $P_{appui}$.

As can be seen particularly from the proceeding description, the invention allows the trailer to contribute to the driving force of the vehicle, by allowing it to provide a driving force as a direct function of the slipping of the wheels of the tractor, and thus of the detection of the difficulty encountered by the tractor to drive the vehicle, and also assuring a minimum power force from the trailer.

Obviously, numerous modifications and variations of the present invention are possible in light of the above teachings. It is therefore to be understood that within the scope of the appended claims, the invention may be practiced otherwise than as specifically described herein.

I claim:

1. Process for controlling the torque transmitted to the trailer of a tractor-trailer vehicle, in which the motor of the tractor drives on one hand the driving wheels of the tractor, through a gear box, and on the other hand, through a power take-off, a hydraulic pump feeding, via a hydraulic circuit, at least one hydraulic motor on the trailer, said hydraulic motor driving the driving wheels of the trailer, the rotating speed of the pump being bound to the rotational speed of the wheels of the tractor, and the rotational speed of the motor being bound to the rotational speed of the wheels of the trailer, said process comprising the steps of:

establishing, in the hydraulic circuit interconnecting the hydraulic motor and the hydraulic pump, between the input and the output of at least one of the hydraulic motor and the hydraulic pump machines, a by-pass circuit adapted to allow a slipping between the speed of the hydraulic motor and the speed of the hydraulic pump, generating in the by-pass circuit a pressure loss such that a variation of the speed slipping, resulting in a variation of the flow through said by-pass circuit, produces a perceptible pressure difference in the pressure side of the hydraulic circuit, determining the slipping between the rotational speed $V_m$ of the hydraulic motor and the speed $V_p$ of the hydraulic pump, in relation to a reference value, and simultaneously checking the pressure in the pressure side of the hydraulic circuit and, when said pressure goes outside a predetermined interval, acting on the capacity of at least one of the hydraulic pump or hydraulic motor machines to bring the slipping back to zero.

2. Process according to claim 1, further comprising the step of determining the speed slipping by the difference $(k-V_p/V_m)$ between a predetermined value (k) and the actual value $(V_p/V_m)$ of the ratio between the speed of the hydraulic pump and the speed of the hydraulic motor.

3. Process according to claim 1 or 2, further comprising acting on the capacity of one of the hydraulic machines by a correction signal proportional to said difference $(k-V_p/V_m)$ between the prdetermined value and the actual value of the speed ratio $V_p/V_m$.

4. Process according to claim 1, further comprising defining, for the pressure side of the pump-motor hydraulic circuit, on one hand a maximum pressure $P_{max}$ corresponding to the maximum driving force required from the trailer, and on the other hand a minimum pressure $P_{appui}$ corresponding to the minimum driving force required from the trailer, and defining said predetermined pressure interval by the pressure interval between the pressure $P_{max}$ and the pressure $P_{appui}$.

5. Process according to claim 4, further comprising measuring the load on the trailer, and defining $P_{max}$ as a function of said load.

6. Process according to claim 1, wherein the pressure losses due to the leakages of the hydraulic machines and the hydraulic circuit are included in the required relationship between the pressure and the flow through the bypasses, or the speed slipping.

7. Process according to claim 6, further comprising supplementing the leakages by a physical by-pass, with a predetermined pressure loss, for establishing the required relationship between the pressure and the flow through the by-pass, or the speed slipping.

8. Process according to claim 1, wherein the capacity of the hydraulic pump with variable capacity is changed, while maintaining constant the capacity of the hydraulic motor.

9. Process according to claim 1, wherein the capacity of the hydraulic motor with variable capacity is changed, while maintaining constant the capacity of the hydraulic pump.

10. Process according to claim 1, wherein the capacity of the hydraulic pump and the capacity of the hydraulic motor are changed in opposite directions.

11. Device for controlling torque, comprising:
a vehicle having a tractor and a trailer;
said tractor having a motor for driving the wheels of the tractor and also for driving a hydraulic pump;
a trailer connected to said tractor having at least one hydraulic motor connected to said hydraulic pump by way of a hydraulic circuit for driving the wheels of the trailer;
said hydraulic circuit including a bypass circuit which allows pressure-controlled slipping between the speed of the hydraulic motor and the speed of the hydraulic pump;
a control circuit;
a first signal line connecting said pump with said control circuit for carrying a signal indicative of the rotational speed of the pump;
a second signal line connecting said pump and said control circuit for carrying a signal indicative of the output pressure of the pump;
a third signal line connecting said hydraulic motor with said control circuit for carrying a signal indicative of the rotational speed of the motor;
a fourth signal line connecting said trailer with said control circuit for carrying a signal indicative of the load on the trailer;
an output signal line connecting said control circuit with said pump to control the capacity of the pump according to the signal carried therein;
wherein said control circuit receives signals from said first to fourth signal lines and produces said control signal in order to control said pump when the output pressure from said pump lies within a predetermined interval.

12. Device for controlling torque, comprising:
a vehicle having a tractor and a trailer;
said tractor having a motor for driving the wheels of the tractor and also for driving a hydraulic pump;
a trailer connected to said tractor having at least one hydraulic motor connected to said hydraulic pump by way of a hydraulic circuit for driving the wheels of the trailer;
said hydraulic circuit including a bypass circuit which allows pressure-controlled slipping between the speed of the hydraulic motor and the speed of the hydraulic pump;
a control circuit;
a first signal line connecting said pump with said control circuit for carrying a signal indicative of the rotational speed of the pump;
a second signal line connecting said pump and said control circuit for carrying a signal indicative of the output pressure of the pump;
a third signal line connecting said hydraulic motor with said control circuit for carrying a signal indicative of the rotational speed of the motor;
a fourth signal line connecting said trailer to said control circuit for carrying a signal indicative of the load on the trailer;
an output signal line connecting said control circuit with said motor to control the capacity of the motor according to the signal carried therein;
wherein said control circuit receives signals from said first to fourth signal lines and produces said control signal in order to control said motor when the output pressure from said pump lies within a predetermined interval.

* * * * *